UNITED STATES PATENT OFFICE.

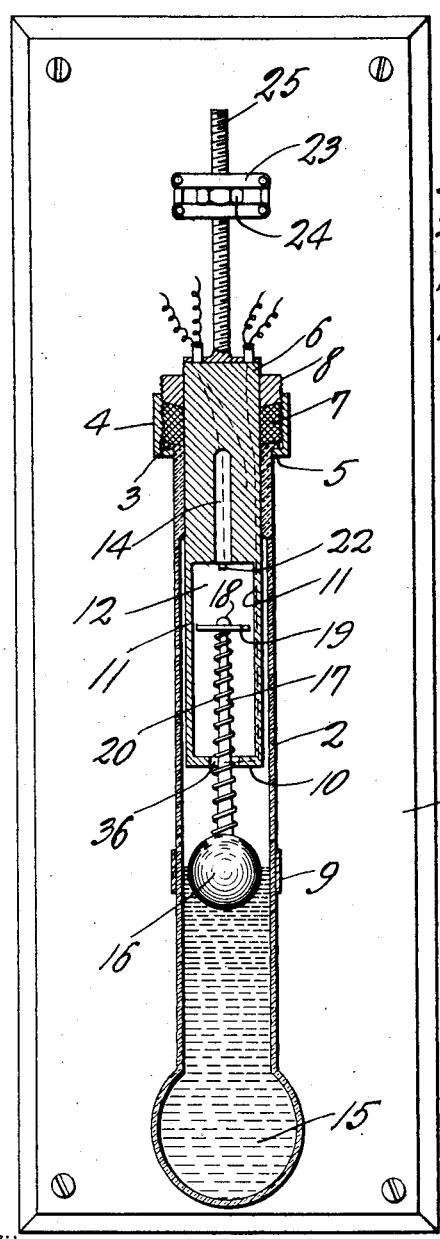

SAMUEL ISAIAH HENDRIX, OF CRESCENT CITY, FLORIDA.

TEMPERATURE-ALARM.

1,181,884.  Specification of Letters Patent.  Patented May 2, 1916.

Application filed July 21, 1914. Serial No. 852,272.

*To all whom it may concern:*

Be it known that I, SAMUEL I. HENDRIX, a citizen of the United States, residing at Crescent City, in the county of Putnam and State of Florida, have invented a new and useful Temperature-Alarm, of which the following is a specification.

The device forming the subject matter of this application is a temperature alarm of the thermometer type and is adapted to indicate specified temperatures considered dangerous either on account of a rise in temperature above normal, or a fall in temperature below normal, the structure being useful, in connection with the ventilation and fire protection of buildings, in fruit orchards and elsewhere, where a device of this type may be employed to advantage.

The invention aims, primarily, to provide an air tight thermometer having adjustable contact terminals adapted to coact with the float in the thermometer tube.

One object of the invention is to improve the float construction.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in vertical longitudinal section, parts appearing in elevation; Fig. 2 is a side elevation of the structure shown in Fig. 1; Fig. 3 is a diagrammatic view illustrating the electrical circuits.

In carrying out the present invention there is provided a suitable base of any sort, indicated by the reference character 1. A thermometer tube 2 is shown, the same being graduated as indicated at 35, according to any scale. At the upper end of the tube 2 there is formed an outstanding flange 3. A cap 4 surrounds the upper end of the tube 2 and is provided with an inwardly projecting flange 5 which engages beneath the flange 3. Mounted in the upper end of the tube 2 is a closure, preferably taking the form of plug 6. The plug 6 may be made of glass or other non-conducting material and is ground to a close fit within the tube 2. Surrounding the plug or closure 6 and abutting against the upper end of the tube 2 is a compressible gasket 7 held in place by means of a nut 8 threaded into the upper end of the cap 4. The tube 2 may be held on the base 1 by means of a band 9 or in any other manner. The plug or closure 6 comprises a platform 10 and arms 11 connecting the platform 10 with the body portion of the plug, a recess 12 being formed in the plug adjacent its lower end. Extended upwardly into the plug 6 and communicating with the recess 12 is a bore 14.

The liquid in the thermometer tube 2 is indicated at 15 and upon the liquid 15 rests a float 16 including a stem 17 passing upwardly through an opening 36 in the platform 10. The upper end of the stem 17 terminates in an enlarged head 18. A bridge 19 of conducting material is slidable on the stem 17, the stem and the body portion 16 of the float preferably being fashioned from non-conducting material. The bridge 19 is held against the head 18 by means of a compression spring 20 abutting against the float proper 16 and against the under face of the bridge 19. The bridge 19 is provided with a finger 34 adapted to move adjacent the graduations 35 on the tube 2 and indicate the degree of temperature. On the upper face of the platform 10 there are spaced electrical terminals 21 and upon the lower face of the body portion of the plug 6 there are electrical terminals 22.

Secured to the base 1 is a frame 23 through which passes a threaded stem 25 constituting a part of the plug 6. Held in the frame 23 and threaded onto the stem 25 is a nut 24.

The numeral 26 indicates a signal or signals of any desired sort, in the present instance shown in the form of an electric bell. A source of electrical energy, such as a battery 27 is depicted in the drawing. A conductor 29 leads from one side of the battery 27 to one of the terminals 22. From the same side of the battery 27 a conductor 30 leads to one of the terminals 21. A conductor 31 leads from the other side of the battery 27 to one side of the signal 26. From the other side of the signal 26, a conductor 32 leads to the other terminal 22. From the same side of the signal 26 a conductor 33 leads to the other terminal 21.

When the temperature falls and when the float 16 descends, the conducting bridge 19 ultimately comes in contact with the terminals 21. Then there is established a circuit comprising the battery 27, the conductor 30, one terminal 21, the bridge 19, the other terminal 21, the conductor 33, the signal 26, and the conductor 31.

When the temperature rises above a predetermined point, there is established a circuit comprising the battery 27, the conductor 29, one of the terminals 22, the bridge 19, the other terminal 22, the conductor 32, the signal 26 and the conductor 31.

The showing of Fig. 3 is largely diagrammatic and it will be understood readily that an electrician having before him the structure shown in Figs. 1 and 2 will make up any desired combination of signal circuits which the nature of the work at hand demands.

Attention is directed to the fact that owing to the tight but slidable fit of the plug 6 in the tube 2 and owing to the gasket construction involving the part 7 and the compression nut 8, the thermometer tube will be made practically air tight. However, the closure or plug 6 may be adjusted in the direction of the length of the tube, by rotating the nut 24. Thus, the contact terminals 21 and 22 may be raised and lowered, varying the points at which the signal 26 will be operated.

The spring 20 serves to hold the bridge 19 against the head 18 on the upper end of the stem 17. When the bridge 19 comes into contact with the terminals 22, and if the float 16 continues to rise, the upper end of the stem will retire into the bore 14 of the plug 6.

Broadly considered, the present invention is of importance in that it combines, in combination with a sealed thermometer tube, a means whereby a pair of electrical terminals may be adjusted along a scale on the tube, to change the point at which the circuit is closed and the signal is rendered effective.

Having thus described the invention, what is claimed is:—

A temperature alarm comprising a thermometer tube; a movable closure therefor and having a bore; electrical terminals carried by the closure; a float in the tube; a bridge slidable on the float and adapted to coact with the terminals; and a float carried spring exerting a pressure against the bridge, a portion of the float being adapted to retire into the bore when the spring is compressed.

In testimony that I claim the foregoing as my own, I have hereto affixed my signature in the presence of two witnesses.

SAMUEL ISAIAH HENDRIX.

Witnesses:
C. E. GUTTERIDGE,
M. F. PIXTON.